Oct. 9, 1951  C. W. DART  2,570,922

ANTISKID DEVICE

Filed Nov. 17, 1948

INVENTOR
CHARLES W. DART
BY
ATTORNEY

Patented Oct. 9, 1951

2,570,922

UNITED STATES PATENT OFFICE 2,570,922

ANTISKID DEVICE

Charles W. Dart, York, Pa., assignor to American Chain & Cable Company, Inc., Bridgeport, Conn., a corporation of New York Application November 17, 1948, Serial No. 60,515

6 Claims. (Cl. 152—243)

This invention relates to anti-skid devices, and more particularly to tire chains intended to be used on farm tractors. Farm tractor tires are comparatively thin and are operated under low pressure, and are provided with large cleats molded in the tread. Despite the tread cleats, chains are often required, and the cleats, low pressure and thinness of the tire all limit the types of chain which may be used successfully.

One type of chain which has been successful is that in which a series of short chains are connected to the side chains and to center links to produce a tread in the form of a series of X's. The links of the short chains are very large in comparison to the stock of which they are made, and are bent or twisted to present a large traction area no matter how they are presented to the ground.

These large bent or twisted links are subject to twisting under traction, which shortens the chain of which they form part. Because of the thinness of the tire, such shortening and attendant tightening of the chain as a whole endangers the tire by distorting it. Also, the presence of the cleats on the tread often hinders proper creeping of the chain around the tire, and it has been observed that the center links sometimes turn over, end for end, with consequent binding of the chain to the tire.

It is with a construction of tire chain for farm tractors which will exhibit less tendency to twist, tangle or bind in use that this invention has to do.

It is a primary object of the present invention to provide a farm tractor chain in which the center links are prevented from turning over.

It is a further object of the present invention to provide a farm tractor tire chain in which the tread chains are held against twisting or tangling.

It is a further object of the present invention to provide a farm tractor tire chain which will creep around the tire as required and will not permit spinning of the tire within the chain.

Referring now to the drawings.

Figure 1:
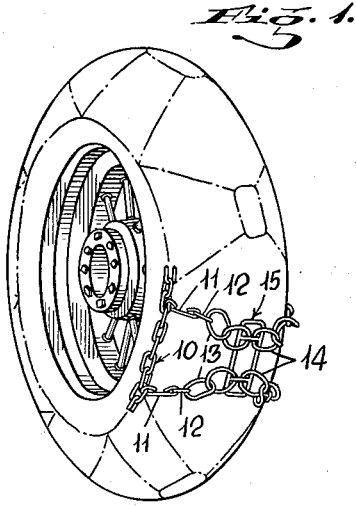
Figure 1 is a view of a tire with a chain of the type contemplated in place thereon.
Figure 2:
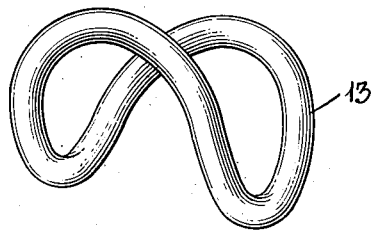
Figure 2 is a detailed view of one of the links of the chain of Figure 1.

The form of the invention shown comprises a pair of side chains 10, with their ends joined in the usual manner, to which are attached the tread assemblies. For this purpose, connecting links 11 are secured to the side chains at intervals. For the purpose of permitting renewal of the tread chains, each of these links has been shown as comprising a length of stock with an eye formed in each end for retaining the links to which it is connected.

Linked with each connecting link is a plain link 12, to which in turn is linked a chain of two bent links 13 and 14. These links 13 and 14, together with the center links form the working part of the tread. They are characterized by being of large size, in comparison to the size of the stock of which they are made. Furthermore, their shape is such that there is always a considerable protrusion from the tread, regardless of the position they take. The shape may be described as being that of a plain link bent about a line oblique of the long axis of the link. It is this oblique bend which causes the links 13 to take the position shown in Figure 3, the position being one in which the tension is applied from adjacent links along the greatest diameter of the links 13.

Link 14 of each chain is connected to a center link 15. This center link may be in a number of forms, but the shown form is illustrative of the principle involved. Link 15 comprises a rectangular frame 16, preferably welded, having a pair of cross members 17 secured to one side thereof, also preferably by welding. The two cross members 17 thus define, with the frame 16, three openings 18, 19 and 20.

The bent links 14 are secured to the center link with their concave sides against the frame 16, and their curved ends extending around the cross bars 17. Thus each link 14 has a side strand 21 passing through the opening 18 or 20 defined by a cross bar 17 and the end of the frame 16, and another side strand 22 passing through the opening 19 defined by the two cross bars 17 and the sides of the frame 16. It will be noted that the ends of each link 14 passes around the cross bar 17 on the side thereof away from the frame, and the links 14 thus project a considerable distance from the general level of the center link. The side on which they project is intended to be the tread side of the assembled chain.

The structure described has several important features. The linking of links 14 to bars 17 renders it impossible for links at opposite ends of the center link to approach each other. This decreases very materially the tendency of the center link to turn over, end for end, when the tractor is operated under heavy draw bar resistance in wet or soft ground.

Figure 3:
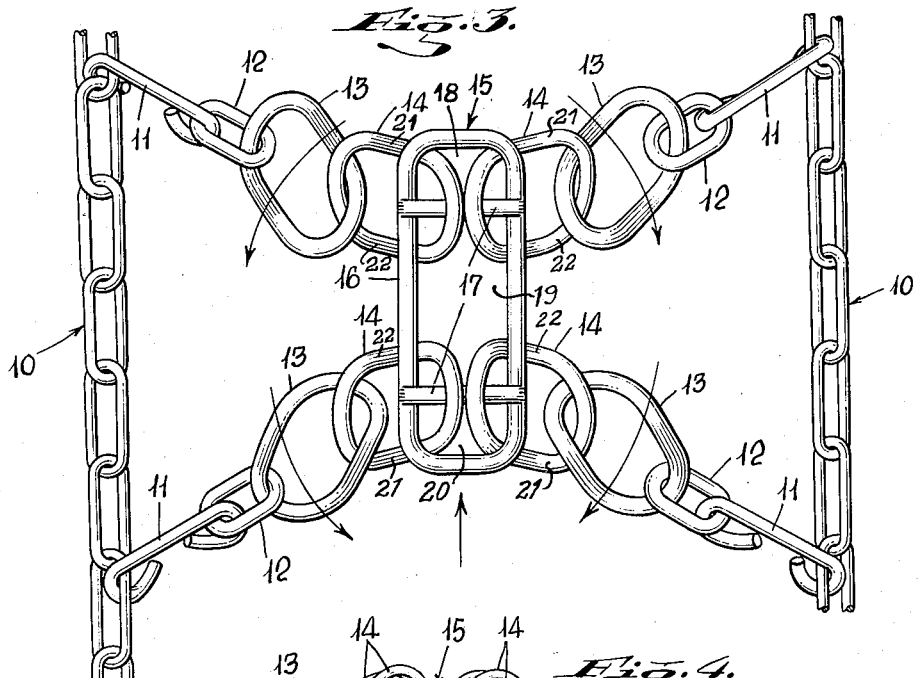
Figure 3 is a developed view of the chain of Figure 1, as it appears when laid on the ground with the side engaging the tire uppermost; and, Figure 4 is a fragmentary view of part of the chain in contact with the tire.
Figure 4:
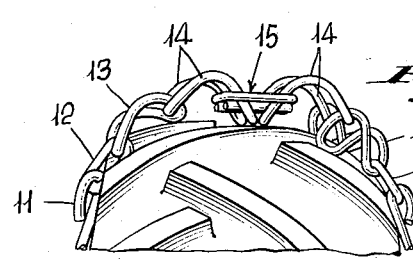

In addition to this, the engagement of links 14 with the center link is in such a manner that the links 14 cannot rotate about a line transverse the tread. In Figure 3, the straight arrow represents the movement of the tractor axle. Movement in that direction tends to rotate links 13 in the direction indicated by the curved arrows in the same figure. They are prevented from so rotating by the engagement of their strands with the strands of links 14. Of course, reverse movement of the tractor would tend to rotate links 13, and the restraint of links 14 is not effective until links 13 have rotated almost half a turn, but, as tractors are not backed under load for any great distance, this is not a serious problem.

In fact, it is possible to construct a chain with alternate links 13 engaging links 14 in a manner to prevent rotation in the opposite direction. Such a chain would be almost as effective in both directions as existing types are in one direction, as existing types do not prevent rotation of the links corresponding to links 14 except in one direction.

It was pointed out that the ends of links 14 project from the general surface of the center link 15 to a considerable degree. It has been found that particularly with new and unworn cleats, there is a tendency for the center link to catch on a cleat, and, as the chain creeps, to have its rear end lifted higher and higher until finally the link turns over, binding the chain to the tire. With the present construction this does not happen, regardless of the tightness, or within reason, looseness of the side chains. The rounded ends of the links 14 engaging the tread are in themselves capable of preventing such catching of the center link, but also, the fact that they are loose, and able to move slightly as the tire deflects seems to work them up over the cleats and around the tread without hindrance. This does not mean that the tire will spin within the chain, however, as the usual tension on the side chains will prevent this.

The above description is illustrative of one form of the present invention, and it is to be clearly understood that many variations are possible within ordinary mechanical skill, and accordingly, the scope of this invention is to be determined from the appended claims.

I claim:

1. In a tread assembly for anti-skid devices of the type including a center link and a plurality of tread chains extending therefrom, a center link having a pair of openings, and a chain link having a substantially oval configuration linked thereto by passage of one side strand through one opening, and its other side strand through the other opening.

2. In a tread assembly for anti-skid devices of the type including a center link and a plurality of tread chains extending therefrom, a center link having a pair of openings, and a chain link having a curved end and side strands curved out of the plane of said curved end, one of said curved side strands passing through one opening, and the other side strand passing through the other opening in the center link, the curved end of the chain link thus lying on the opposite face of the center link from the curved side strands.

3. In a tread assembly for anti-skid devices of the type including a center link and a plurality of tread chains extending therefrom, a center link in the form of a continuous loop defining an opening and having a member extending across the opening of the loop and intersecting the loop, a chain link having side strands and a curved end linked with the center link by passage of the side strands through the opening of the loop on opposite sides of the cross member.

4. In a tread assembly for anti-skid devices of the type including a center link and a plurality of tread chains extending therefrom, a center link in the form of a continuous loop defining an opening and having a member extending across the opening of the loop and intersecting the loop, a chain link having a curved end and side strands curved out of the plane of the end, said side strands passing through the opening of the loop on opposite sides of the cross member with their concave surfaces engaging the loop and the curved end engaging the cross member whereby the chain link is held against turning.

5. In a tread assembly for anti-skid devices of the type including a center link and a plurality of tread chains extending therefrom, a center link in the form of a continuous loop defining an opening and having members extending across the opening of the loop and intersecting the loop, chain links linked to the center link at the intersections of the loop and the cross members, each of said links having curved side strands and curved ends, said side strands of each of said links passing through the opening of the loop on opposite sides of a cross member, with a curved end of each link engaging the cross member and projecting from the general level of the center link.

6. In a tread assembly for anti-skid devices of the type including a center link and a plurality of tread chains extending therefrom, a center link in the form of a continuous loop with cross members extending across the opening of the loop and projecting from one face of the loop, chain links linked to the center link at the intersections of the loop and the cross members, each link having curved ends and curved side strands, the side strands of each link lying with their concave sides against the loop and their curved ends passing around a cross member on the side thereof away from the loop to thereby project from the general surface of the center link.

CHARLES W. DART.

REFERENCES CITED

The following references are of record in the file of this patent:

UNITED STATES PATENTS

| Number | Name | Date |
| --- | --- | --- |
| 1,596,299 | Olson | Aug. 17, 1926 |
| 1,739,522 | Reyburn | Dec. 17, 1929 |
| 1,788,486 | Hall et al. | Jan. 13, 1931 |
| 2,235,408 | Reyburn | Mar. 18, 1941 |